United States Patent [19]

Bolser

[11] Patent Number: 5,906,749

[45] Date of Patent: *May 25, 1999

[54] METHOD FOR RECOVERING METALS FROM SOLUTIONS

[75] Inventor: Daniel G. Bolser, Bellevue, Wash.

[73] Assignee: Great Western Chemical Company, Portland, Oreg.

[ * ] Notice: This patent is subject to a terminal disclaimer.

[21] Appl. No.: 08/944,541

[22] Filed: Oct. 7, 1997

Related U.S. Application Data

[63] Continuation of application No. 08/541,523, Oct. 10, 1995, Pat. No. 5,679,259, which is a continuation-in-part of application No. 08/193,484, Feb. 7, 1994, Pat. No. 5,472,618.

[51] Int. Cl.⁶ ........................................................ C02F 1/62
[52] U.S. Cl. ........................... 210/719; 210/724; 210/912; 75/726
[58] Field of Search ..................................... 210/719, 912, 210/721, 722, 724, 757; 75/726

[56] References Cited

U.S. PATENT DOCUMENTS

5,169,538  12/1992  Habermann et al. .................... 210/719
5,679,259  10/1997  Bolser ..................................... 210/719

Primary Examiner—Jay H. Woo
Assistant Examiner—Betsey J. Morrison
Attorney, Agent, or Firm—Chenoff, Vilhauer, McClung & Stenzel, LLP

[57] ABSTRACT

A method for recovering metals from solutions is described. A particular embodiment of the method concerns recovering copper metal from aqueous solutions containing copper ions, such as ammoniacal circuit-board etching solutions. A working embodiment of the invention includes first treating a solution containing copper ions with a sufficient amount of an acid to obtain a solution pH of from about 1 to less than about 2.5. A reducing metal, such as iron, is then added to the solution to precipitate metal ions as metals. The reducing metal has a mesh size of about 230 or greater. The metal precipitate is recovered from the solution. The method is generally sufficiently efficient to allow discharge of solutions treated according to the method of the invention into public waste waters wherein the solution has less than about 5 ppm, and preferably less than 2 ppm, metal ions.

23 Claims, 1 Drawing Sheet

FIG. 1

1. OBTAINING A SOLUTION CONTAINING OXIDIZED METAL IONS

2. DILUTING THE SOLUTION WITH WATER

3. ACIDIFYING THE SOLUTION WITH AN INORGANIC ACID TO A pH OF FROM ABOUT 1.0 TO LESS THAN ABOUT 2.5

4. ADDING TO THE ACIDIFIED SOLUTION A FINELY DIVIDED REDUCING METAL

5. AGITATING THE SOLUTION (NOT NECESSARY)

6. RECOVERING THE PRECIPITATED METAL

METHOD FOR RECOVERING METALS FROM SOLUTIONS

CROSS REFERENCE TO RELATED APPLICATIONS

The present application is a continuation of U.S. patent application Ser. No. 08/541,523, filed Oct. 10, 1995, now U.S. Pat. No. 5,679,259, issued Oct. 21, 1997, which is a continuation-in-part of U.S. patent application Ser. No. 08/193,484, filed Feb. 7, 1994, now U.S. Pat. No. 5,472,618, issued Dec. 5, 1995. The parent application is incorporated herein by reference.

FIELD OF THE INVENTION

This invention concerns a method for recovering metals from solutions.

BACKGROUND OF THE INVENTION

The toxicity of metals has been well documented, and releasing effluents containing metals into the environment is now strictly controlled by environmental protection laws. For instance, the effluent limitations on copper are as low as about 0.0017 pounds of copper per 1,000 pounds of effluent (about 1.7 parts per million). 40 C.F.R. § 421.52. The electronics industry generates large volumes of used circuit-board etching solution containing high levels of copper ions. This effluent cannot be discharged directly into the environment without first being subjected to expensive procedures to reduce the effluent copper concentration.

Some processes are known for removing metal ions from solution. For instance, Spedden et al.'s U.S. Pat. No. 3,634,071 concerns a process for accelerating the precipitation of copper from solution. According to Spedden's process, a solution containing copper ions must be treated with sulfur dioxide. The purpose of the sulfur dioxide is to produce hydronium ions ($H^+$) by reacting with water to form sulfurous acid ($H_2SO_3$). This compensates for the consumption of hydronium ions that occurs during the reduction of copper ions. Spedden teaches that using sulfuric acid as the sole source of hydronium ions is unacceptable in a process for recovering copper ions from solution.

Guess' U.S. Pat. No. 5,122,279 also describes a process for removing dissolved metals from water. The process comprises treating solutions containing heavy metals with ferrous dithionate to form a complex which precipitates from solution. Guess attempted a number of copper recovery trials to compare his process to other processes for recovering copper. Example I of Guess discusses treating a feed solution with steel wool. Guess indicates that some removal of copper was visually evident as the steel-wool mass gradually turned from steel color to copper-colored fibers. Atomic absorption spectrometry of the treated solution indicated that only 28 percent of the copper in the solution was collected on the steel wool.

Example VI of Guess discusses removing copper from solution using iron particles. A liter of a solution having a pH of about 9 and containing copper ions was treated with an equimolar quantity of iron particles. A sample of this solution was withdrawn for filtration after a coating of metallic copper was deposited on the surface of the iron particles. Analysis of the sample determined that approximately 87 percent of the copper remained in solution. Hence, Example VI of the Guess patent teaches that only about 15 percent of the copper ions in solution can be recovered as copper metal by treating the solution with iron powders. A 15 percent conversion is obviously unacceptable when the copper concentration in an effluent can be no greater than about 2 ppm.

Guess also discusses U.K. Patent Application GB 125828 A. This application describes a process involving contacting a solution containing copper ions with steel wool. According to Guess, the problems associated with this method include: (1) an uneconomically low conversion of copper ion to copper metal; (2) a high cost associated with steel wool; and (3) a high labor cost associated with handling the materials.

Despite ongoing investigations, a process for efficiently and inexpensively recovering metals from solutions containing ions of the metal still has not been developed. Although it is known to treat solutions with iron to precipitate low levels of copper, this reaction has not been effectively tailored for recovering copper ions from used circuit-board etching solutions. Moreover, the patents discussed above teach that simply using iron to recover copper metal is an inefficient and unacceptable method for recovering copper from solutions containing copper ions.

SUMMARY OF THE INVENTION

The present invention provides a process for recovering metals from aqueous solutions. The method comprises treating aqueous solutions containing ions of a first metal, such as copper (II), with a finely-divided reducing metal within a controlled pH range to precipitate the first metal from solution. The invention addresses the problems identified in the Background of the Invention for prior related processes. A preferred process according to the present invention accomplishes at least two goals: (1) The metal ions in solution are reduced to the zero oxidation state to produce reusable metals. For instance, copper (II) is reduced to copper (0). The recovered copper metal preferably should have a sufficient purity to allow for subsequent use, such as greater than about 60 percent pure. (2) The concentration of copper (II) ions remaining in solution is reduced to be within applicable environmental regulations, such as from about 2 ppm to about 3 ppm, prior to disposal or discharge into the environment.

One embodiment of the method comprises treating an aqueous solution containing metal ions with a sufficient amount of an inorganic acid to obtain a pH of less than about 2.5. Thereafter, a finely-divided metal reducing agent is added to the solution in an amount sufficient to reduce substantially completely the dissolved metal ions to metals (i.e., a metal in the zero oxidation state). The reducing metal added to the solution has an oxidation potential greater than the metal ions in solution. Without limitation, a preferred inorganic acid is sulfuric acid, and a preferred reducing metal is iron.

The size of the metal particles also appears to influence the efficiency of the reaction. When iron is used as the reducing agent, the iron preferably should have a mesh size of 230 or greater (larger mesh size correlates with smaller particles). The iron powder may be added to the solution batchwise or continuously, and the solution may be agitated during the addition.

A particular embodiment of the invention comprises treating a solution containing copper ions with a sufficient amount of an inorganic acid to obtain a pH of less than about 2.5. A finely-divided metal powder is then added to the solution in an amount sufficient to substantially completely reduce the copper ions to copper metal. The metal preferably has a mesh size of 230 or greater and an oxidation potential greater than copper. The copper metal is then recovered, such as by filtration, with the solution thereafter having a copper ion concentration of less than about 5 ppm, preferably from about 2 ppm to about 3 ppm, and even more preferably less than about 2 ppm.

A preferred embodiment of the method comprises first diluting an aqueous solution containing copper ions with water. Without limitation, a preferred dilution is about a five-fold volume dilution. The diluted solution is then treated with a sufficient amount of sulfuric acid to obtain a solution pH of from about 1.0 to less than about 2.5. A sufficient amount of iron powder is then added to the solution to precipitate the copper ions as copper metal. The amount of iron to be added to the solution may be determined empirically, or by measuring the oxidation-reduction potential of the solution using techniques known in the art. The iron powder has a preferred mesh size of 230 or greater. The copper metal that precipitates is recovered using a filter press, and the solution thereafter has a copper ion concentration of less than about 5 ppm, preferably less than about 2 ppm. The recovered copper metal has a purity of greater than about 60 percent.

An object of the present invention is to provide a process for treating circuit-board etching solutions with iron powder to precipitate dissolved copper ions as copper metal, thereby obtaining an etching solution that is substantially completely free of copper ions.

Still another object of the present invention is to provide a process whereby a substantially pure copper metal can be obtained from used circuit-board etching solutions by treating such solutions with iron powder wherein the copper ion concentration in the treated etching solution is decreased to about 2 ppm.

DETAILED DESCRIPTION OF THE PREFERRED EMBODIMENTS

Figure 1:
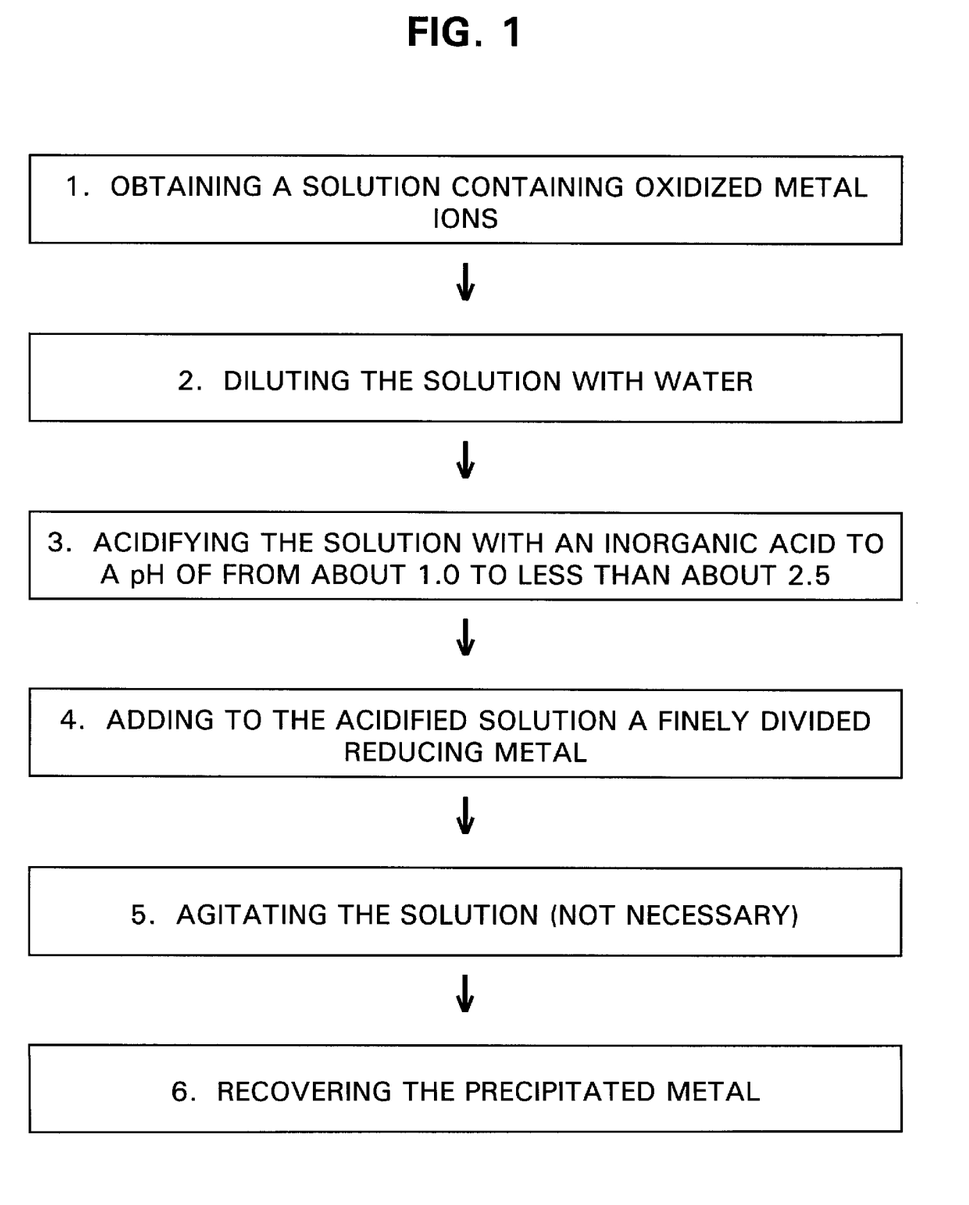
FIG. 1 is a flow chart showing certain process steps used to practice a working embodiment of the present invention.

In accordance with one embodiment of the present invention, finely-divided metal powders are used as reducing agents to precipitate from aqueous solutions metals having a lower oxidation potential. The process steps for one particular embodiment of the invention include: (1) obtaining an etching solution containing dissolved metal ions; (2) diluting the solution with water; (3) acidifying the diluted solution with an inorganic acid to a pH of below about 2.5, and preferably from about 1.0 to about 2.0; (4) adding a reducing metal, having a particle size of 230 mesh or smaller, to the solution. Without limiting the present invention to one theory of operation, it appears that an oxidation/reduction reaction (redox reaction) occurs upon the addition of the reducing metal to the solution. For instance, iron may be used as a reducing metal if copper ions are dissolved in solution. Iron (0) reduces copper (II) to copper (0) metal; and (5) recovering the precipitated metals.

Each of the reagents used to practice this invention, as well as each of the process steps summarized above, will be discussed in more detail below.

I. REAGENTS

A. Circuit-Board Etching Solution

One embodiment of the present invention is particularly useful for treating ammoniacal etching solutions to precipitate copper ions. "Ammoniacal" refers to a solution containing ammonia or ammonium salts. Such solutions also may contain a number of other inorganic species, such as cupric chloride. Ammoniacal etching solutions are basic, having a pH of typically greater than about 9.

A discussion of ammoniacal etching solutions is provided in Lee's U.S. Pat. No. 4,915,776, entitled "Process for Etching Copper with Ammoniacal Etchant Solution and Reconditioning the Used Etchant Solution." Lee's patent is incorporated herein by reference. According to Lee's patent, the reactions between copper and the ammoniacal etching solution can be summarized as follows:

1. Reactions of Copper with Anmoniacal Etching Solutions

REACTION 1

$$Cu^0 + Cu^{2+}(NH_3)Cl_2 \rightarrow 2Cu^+(NH_3)_2Cl$$

REACTION 2

$$2Cu^+(NH_3)_2Cl + 2NH_4OH + 2NH_4Cl + \tfrac{1}{2}O_2 \rightarrow 2CU^{2+}(NH_3)_4Cl_2 + 3H_2O$$

The overall reaction can be determined by adding reactions 1 and 2, as shown below in Reaction 3.

REACTION 3

$$Cu^0 + 2NH_4OH + 2NH_4Cl + \tfrac{1}{2}O_2 \rightarrow Cu(NH_3)_4Cl_2 + 3H_2O$$

Reaction 3 shows that the overall reaction involves the reduction of Cu metal [indicated as $Cu^0$, i.e., copper in the zero oxidation state] with ammonium hydroxide ($NH_4OH$), ammonium chloride ($NH_4Cl$) and oxygen. The product is an oxidized ammonia copper complex with copper oxidized to $Cu^{2+}$.

An "oxidation reaction" refers to any reaction in which electrons are transferred. "Oxidation" specifically refers to a chemical species which loses electrons. "Reduction" refers to a chemical species that gains electrons. The compound or element which gains electrons is referred to as the "oxidizing reagent"; the agent that loses electrons is referred to as the "reducing agent." By way of example, if copper (II) ions are present in an etching solution, then the oxidation reaction would refer to the transfer of electrons from Fe (0) to copper (II). Iron loses two electrons and becomes positively charged, i.e., is oxidized. Copper (II) gains two electrons and becomes neutral, i.e., is reduced. Copper (II) is referred to as the "oxidizing agent."

The terms "reduction potential" and "oxidation potential" also are used in this application. "Oxidation potential" refers to the potential of a chemical species to lose or donate electrons. "Reduction potential" refers to the potential of a chemical species to gain electrons. A discussion of these concepts can be found in a number of standard chemistry texts, including, for example, Cotton and Wilkinson's "Advanced Inorganic Chemistry," published by John Wiley & Sons.

B. Metal Powder

One aspect of the present invention involves treating an etching solution with a finely-divided metal. "Finely divided" is defined below in terms of mesh size. The metal is selected to have an oxidation potential sufficient to reduce the metal ions in solution to the zero oxidation state. The selection of the metal will depend upon a number of factors, including the oxidation potentials of the metals in question. It will be appreciated by one skilled in the art that a number of metals have a sufficient oxidation potential to reduce a particular ion, such as copper (II). Whether a particular metal has a sufficient oxidation potential can be determined either empirically, or by examining the electrochemical series and calculating the free energy associated with a particular reaction. This procedure is known to those of skill in the art. And, the electrochemical series is published in a number of standard references, including The Handbook of Chemistry and Physics, which is published by CRC Press.

By way of example, if the dissolved ion of interest is copper (II), then a number of metals potentially can be used to reduce the copper (II) to copper (0). This can be determined by knowing the following potential data for copper (as shown in Table 1 below) and comparing such data to the potential of the reducing agent:

TABLE 1

| | |
|---|---|
| $Cu^+ + e^- = Cu^0$ | $E^0 = 0.522$ V |
| $Cu^{2+} + e^- = Cu^+$ | $E^0 = 0.153$ V |
| $Cu^{2+} + 2e^- = Cu^0$ | $E^0 = 0.340$ V |

By way of example and without limitation, metals that can be used to reduce copper (II) to copper (0) include: (1) magnesium ($Mg^{2+}+2e^-=Mg$; $E^0=-2.375$ V); (2) manganese ($Mn^{2+}+2e^-=Mn$; $E^0=-1.029$ V); and (3) iron ($Fe^{2+}+2e^-=Fe$; $E^0=-0.409$ V). For the present invention, applicant has determined that iron is a preferred metal useful for reducing copper (II) ions in solution to copper (0). One reason for this, other than the fact that iron has a sufficient oxidation potential, is because iron is readily available and relatively inexpensive.

As stated in the Background of the Invention, steel wool and iron particles previously have been tried to precipitate copper ions from solution. These previous processes have proven unsatisfactory. Surprisingly, and contrary to the teachings of the prior art, applicant has determined that a process involving using an iron powder that (1) is at least about 70 percent pure, and preferably at least about 90 percent pure, and (2) has a suitably small mesh size, produces an efficient reduction of copper ions to copper metal in acidic aqueous solutions. Currently, a mesh size of 230 or larger (i.e., smaller metal particles) is preferred. Particle sizes smaller than 230 mesh also are suitable for practicing the invention. Working embodiments of the present invention have used metal powders having a mesh size of as small as about 400 mesh. However, in terms of the percent copper ion remaining in the supernatant following treatment with a reducing metal, such as iron, the preferred mesh size appears to be 230 or greater. However, if the percent copper metal obtained by the process is a guiding consideration in the selection of the metal particle size, then it currently appears that mesh sizes greater than about 300 and less than about 400 are preferred. Thus, as used herein, the phrase "finely-divided metal" describes a metal having a sufficient purity and a sufficiently small mesh size to efficiently carry out the desired reaction, namely the reduction of dissolved metals ions to the zero oxidation state. The effects of particle size on the reaction efficiency are considered further in the examples provided below.

One skilled in the art will realize that iron powders meeting the requirements stated herein can be obtained from a number of sources. One source of an iron powder suitable for the present invention is Hoeganaes Company, of Riverton, N.J.

C. Inorganic Acid

Etching solutions, particularly ammoniacal etching solutions, are basic and therefore have a pH greater than about 7. More typically, ammoniacal, etching solutions have a pH of greater than about 9. A surprising increase in reaction efficiency, in terms of the recovery of copper metal and the decontamination of etching solutions, can be achieved by treating etching solutions with finely-divided iron powders at a pH of less than about 2.5, and even more preferably at a pH of from about 1.0 to about 2.0.

Thus, the process of the present invention includes the step of acidifying the solution prior to treating the solution with the finely-divided metal powder. Acidification typically is accomplished using an inorganic acid. Suitable inorganic acids include, without limitation, hydrochloric acid, nitric acid, sulfuric acid and phosphoric acid. A presently preferred inorganic acid is sulfuric acid. Sulfuric acid is readily available from a number of commercial sources, and is relatively inexpensive. Furthermore, and again without limiting the invention to one theory of operation, applicant currently believes that the intermediate formation of copper sulfate aids the subsequent reduction of aqueous copper (II) ion to copper (0) metal.

II. PROCESS STEPS

Using the reagents discussed above, the present invention provides a process whereby metal ions are reduced and precipitated from solution. Certain of the process steps of the invention will now be discussed in more detail.

A. Dilution

A used industrial solution, such as ammoniacal etching solution, generally is diluted with water as a first process step. One purpose of this dilution is to decrease the heat generated by neutralizing the solution upon the addition of an inorganic acid. For instance, the heat produced by the exothermic neutralization reaction may be sufficient to melt polymeric containers if the solution is not first diluted. One skilled in the art will realize that the amount of dilution required for a particular reaction will depend upon the amount of heat of neutralization that is generated. To provide a guideline, the solution should be maintained at a temperature below about 100° C. so that the water, and any compounds less volatile than water, is not vaporized during the process. Even more preferably, the dilution should be sufficient so that the heat of neutralization does not increase the temperature of the solution to much greater than about 50° C.

By way of example only, a five-fold volume dilution of ammoniacal etching solution sufficiently controls the temperature increase that results from the evolution of heat during addition of the inorganic acid. One of ordinary skill in the art will realize that there is nothing critical about a five-fold volume dilution.

Smaller and larger volume dilutions also may suffice. Presently, it is believed that volume dilutions of from about a two-fold volume dilution to about a ten-fold volume dilution, preferably from about a three-fold volume dilution to about a six-fold volume dilution, and even more preferably about a five-fold volume dilution, will suffice for the present invention.

B. Acidification

Following dilution, the solution then is treated with an inorganic acid. The pH of the solution has a surprising influence on the efficiency of the reaction. The influence of pH on the reaction is considered further in the examples provided below. However, when a solution having a pH of greater than about 3.0 is treated with a finely-divided iron powder, the recovery of copper metal from the solution is unacceptably low. Specifically, when the pH of the solution is greater than about 3, atomic absorption spectrometry shows that the recovery of copper metal from the ammoniacal etching solution is less than about 20 percent. However, if the pH is less than about 3, then a specific pH need not be achieved in order to provide a satisfactory reaction. In other words, although pH is important, a range of pH values below about a pH of 3, and preferably about 2.5 or less, still provides satisfactory results.

C. Addition of Finely-Divided Metal Powder

Following the step of acidification, the solution is ready for treatment with a reducing metal. The finely-divided metal powder may be added to the etching solution either batchwise or continuously. Currently, the continuous addition of metal powder is considered preferable to batchwise addition. Presumably, continuous addition prevents agglomeration of the metal powders in solution, thereby providing more surface area for reaction with the metal ions in solution.

The amount of metal powder added to the solution depends on the amount of oxidized metal ions in solution. If the total amount of dissolved ions in solution is known, or if the concentration of the metal ions in solution is known, then the amount of iron powder that should be added to the solution also can be determined. For instance, if the metal in solution is copper, then about an equimolar amount of iron should be added to the solution. This is because the reaction appears to involve a 1:1 molar ratio of iron and copper. This can be seen by comparing the half reactions for copper and iron as shown below in Reaction 4:

REACTION 4

$Cu^{2+} + 2e^- \longrightarrow Cu^0$ $Fe^0 \longrightarrow Fe^{2+} + 2e^-$ $Cu^{2+} + Fe^0 \longrightarrow Cu^0 + Fe^{2+}$ Reaction 4 shows that an equimolar amount of iron (0) should be added to reduce the copper (II) ion to copper metal. However, in practice it is generally preferred to add a slight molar excess of the iron powder to the copper-containing solution. Currently, from about a 1.1 to about a 1.5 molar excess of iron is added to the solution to ensure complete reduction of the copper (II) ions in solution to copper metal.

An alternative method for determining the amount of reducing metal that should be added to the solution containing metal ions involves determining the oxidation-reduction potential (ORP) of the solution. ORP involves measuring the voltage capacity of the solution. The method for determining the amount of iron powder to be added to a solution comprises first forming a solution having a known concentration of ions in solution. For instance, if the solution is an ammoniacal solution containing copper (II) ions, a standard solution can be formed having about the same concentration of copper (II) ions. The potential of the solution is then measured using standard devices known in the art. Thereafter, iron powder is added to the solution until the supernatant has a copper (II) ion concentration of about 2 ppm. The potential of the solution is again measured. The value of the potential is then used as a reference point for determining how much iron should be added to larger, industrial quantities of etching solution.

The reaction also is facilitated by agitating the reaction during, and perhaps subsequent to, the addition of the finely-divided iron powder. Agitation can be accomplished in a number of ways. For instance, the etching solution can be continuously stirred with devices known in the art, such as mechanical stirrers. It will be apparent that magnetic stirrers are not preferred because if magnetic metals, such as iron particles, are added to the solution such particles will be attracted to the magnetic stir bar. Moreover, one skilled in the art also will understand that agitation methods other than mechanical stirring can be employed. One example would be to sonically agitate the solution.

D. Recovering Reduced Metals

The finely-divided metal apparently reduces metal ions in the solution that have a lower oxidation potential than does iron. Once the etchant solution is treated with a reducing metal, the dissolved metal ions having a lower oxidation potential are reduced and generally precipitate from solution. Sometimes the pH of the solution may require adjustment upwards in order to cause the reduced metals to precipitate. The composition containing the precipitated metal is then passed to a press filter to reduce the amount of water present in the precipitated solids. Although press filters are known in the art, a presently useful press filter is a J-press filter by JWI Inc., having a 630 mm plate size. Once the water content of the precipitated solids is reduced, the dehydrated solids are recovered.

When the metal ions in solution are copper ions, the product from the press filter is both copper metal and an etching solution that has had the copper ions substantially completely stripped therefrom. As used herein, the phrase "substantially completely" means a solution that has a metal-ion concentration of less than about 5 ppm, preferably less than about 3 ppm, and even more preferably from about 1 ppm to about 2 ppm.

The purity of the copper metal and the level of copper ion in the treated etchant solution was determined using atomic absorption. For the present invention, a Perkin/Elmer Atomic Absorption Spectrometer, Model No. 2280, was used to determine both the purity of the copper metal obtained using the process and the level of copper ions still remaining in solution once the etching solution is treated according to the present invention.

An atomic absorption spectra of a copper sample obtained according to the process of the present invention showed that a copper purity of greater than about 70 percent can be obtained. Perhaps more important, and in contrast to the teachings of the prior art, the concentration of copper ions in solution following treatment according to the present invention is less than about 3 ppm.

III. EXAMPLES

The following examples are provided for illustrative purposes only. These examples are in no way intended to limit the scope of the invention to the particular aspects illustrated by such examples.

EXAMPLE 1

This example describes treating a solution containing copper ion with iron powder without acidifying the solution prior to the addition of iron powder. A 250 ml aliquot of an etchant was obtained having a copper concentration of about 135 g/l. Thus, the 250 ml aliquot had a total copper content of about 33.75 grams, or about 0.53 moles. To this aliquot was added 33.75 grams (0.60 mole) of iron having a mesh size of about 400. Thus, about a 1.12 molar excess of iron was added to the solution. Upon the addition of iron, the solution remained unchanged in appearance, indicating that the amount of copper in solution remained relatively unchanged. Thus, treating a solution with iron powder without first acidifying the solution is an unacceptable method of recovering copper metal.

EXAMPLE 2

This example considers what affect acidifying the solution has on the efficiency of the reaction. An etchant solution having the concentration discussed in Example 1 was obtained. Sulfuric acid was added to this solution. The pH target value was about 2.5. However, as the addition of sulfuric acid continued, the viscosity of the solution slowly increased. At a pH of about 7.6, the solution turned unmanageably viscous. This may be the result of the formation of copper hydroxide. This experiment was discontinued when the solution no longer could be stirred.

EXAMPLE 3

This example illustrates what affect diluting and acidifying the solution has on the efficiency of the reaction. A 250 ml aliquot of an etching solution was obtained as described in Example 1. The aliquot was then diluted with water in a 1:5 volume ratio, i.e., a five-fold volume excess of water was added to the solution. The addition of sulfuric acid was then begun. As the pH approached 7.5, the solution became increasingly turbid. The pH continued to decrease as more sulfuric acid was added, and the solution remained turbid. At a pH of about 2.5 the turbidity disappeared and the solution became blue, apparently indicating the formation of aqueous copper sulfate. 33.75 grams of iron powder, having a particle size of about 400 mesh, were then added to the solution. An immediate reaction occurred, and metallic copper began to precipitate. The solution was then filtered to remove the precipitated copper metal. An aliquot of the filtered supernatant was submitted for atomic absorption analysis. The results of the atomic absorption showed that the copper concentration in the supernatant was about 2.67 ppm.

EXAMPLE 4

This example further considers the affects of pH on the reaction efficiency. An etching sample was formed having a copper (II) ion concentration of about 180 g/l copper. The etching first was diluted with a five-fold volume of water. The pH of the solution was then adjusted to be about 3.2. A 250 ml aliquot of the etching solution (containing about 45 grams, 0.71 moles of copper) was then treated with about 45 grams (0.805 moles; a 1.1 molar excess) of iron powder having a mesh size of about 400. A reaction was observed and the solution turned a lighter shade of green. Copper metal also was seen to precipitate. However, the reaction did not continue to completion. It was clear that acidifying the solution to a pH of only about 3.2 did not achieve the desired result. As a result, acidifying to a pH of at least as low as about 2.5 as stated above in Example 3 is preferred and results in a much more efficient reduction of copper ion to copper metal.

EXAMPLE 5

This example describes the treatment of a cupric chloride solution with iron powder according to the present invention. The solution was diluted as described above in Example 4, and then sulfuric acid was added until a pH of about 2.5 was obtained. A slight excess (about 1.1 molar excess) of iron powder was then added to the solution. The solution turned clear, with metallic copper particles settling to the bottom of the container. Thereafter, the filtrate was analyzed by atomic absorption spectrometry, which indicated that the filtrate contained about 100 ppm of copper.

EXAMPLE 6

This example also evaluated what affect pH has on the reaction efficiency. The experiment was conducted exactly as in Example 5, except that the initial pH was adjusted to about 1.5, instead of 2.5. The filtrate was then analyzed using atomic absorption spectrometry. The copper concentration of this sample was less than 1.0 ppm. Thus, the examples discussed herein show that the pH should be less than about 3, preferably less than about 2.5, and even more preferably from about 1.5 to about 2.5, in order to obtain a supernatant that is substantially completely free of copper ion.

EXAMPLE 7

The procedure of Example 5 was repeated with the addition of a final ph adjustment step. This was done in order to obtain a solution having a pH acceptable for introduction into the sewer system. The final pH of the solution was raised to 5.5 with the addition of 50 percent aqueous sodium hydroxide. The production of iron hydroxide was observed, in addition to the metallic copper produced after the earlier process steps. Thereafter, the filtrate was analyzed by atomic absorption spectrometry, which indicated that the filtrate contained less than 1 ppm copper. Additionally, the precipitated material was analyzed by atomic absorption spectrometry for metallic composition. This indicated that the composition of the product was approximately 50 percent copper and 50 percent iron.

EXAMPLE 8

The procedure of Example 7 was repeated. However, a 50 percent aqueous solution of magnesium hydroxide was used instead of sodium hydroxide for the final pH adjustment step. A greatly lessened formation of iron hydroxide was observed, possibly due to the slower rate of neutralization that occurs when using magnesium hydroxide. The precipitated material was then analyzed by atomic absorption spectrometry for metallic composition. This analysis indicated that the composition of the product was greater than 70 percent copper, and less than 30 percent iron.

The following examples further explore the effects of the particle size of the reducing metal, such as iron, on the efficiency and products produced by the reaction. These examples demonstrate that particle sizes of about 230 mesh or greater (smaller particle sizes) produce superior results in terms of both the percent of copper metal obtained and the amount of copper ions remaining in the solution.

EXAMPLE 9

A solution of $CuSO_4 \cdot 5H_2O$ was prepared having a concentration of about 100 g/L. The solution was acidified to a pH of about 1.5 by the addition of $H_2SO_4$ (98 percent). A 100 milliliter aliquot of the acidified solution was treated with 2.60 grams of iron powder (a 16 molar percent excess) having a mesh size of less than 230. The solution was a blue color, indicating the presence of unprecipitated copper. The solution was neutralized using magnesium oxide, dried and weighed. The dry material was then dissolved in aqua regia to produce a solution suitable for ICP analysis.

EXAMPLE 10

A solution of $CuSO_4 \cdot 5H_2O$ was prepared having a concentration of about 100 g/L. The solution was acidified to a pH of about 1.5 by the addition of $H_2SO_4$ (98 percent). A 100 milliliter aliquot of the acidified solution was treated with 2.60 grams (a 16 molar percent excess) of 230 mesh iron powder. The solution was a blue color, indicating the presence of unprecipitated copper. The solution was neutralized using magnesium oxide, dried and weighed. The dry material was then dissolved in aqua regia to produce a solution suitable for ICP analysis.

EXAMPLE 11

A solution of $CuSO_4 \cdot 5H_2O$ was prepared having a concentration of about 100 g/L. The solution was acidified to a pH of about 1.5 by the addition of $H_2SO_4$ (98 percent). A 100 milliliter aliquot of the acidified solution was treated with 2.60 grams (a 16 molar percent excess) of 325 mesh iron powder. The solution was a blue color, indicating the presence of unprecipitated copper. The solution was neutralized using magnesium oxide, dried and weighed. The dry material was then dissolved in aqua regia to produce a solution suitable for ICP analysis.

EXAMPLE 12

A solution of $CuSO_4 \cdot 5H_2O$ was prepared having a concentration of about 100 g/L. The solution was acidified to a pH of about 1.5 by the addition of $H_2SO_4$ (98 percent). A 100 milliliter aliquot of the acidified solution was treated with 2.60 grams (a 16 molar percent excess) of 400 mesh iron powder. The solution was a blue color, indicating the presence of unprecipitated copper. The solution was neutralized using magnesium oxide, dried and weighed. The dry material was then dissolved in aqua regia to produce a solution suitable for ICP analysis.

The results of Examples 9–12 are summarized below in Tables 2 and 3.

TABLE 2

% Copper and Iron of Dried Cake

| | Sample ID | |
|---|---|---|
| Mesh Fe | % Cu | % Fe |
| >230 | 39.6 | 21.3 |
| 230 | 32.4 | 25.0 |
| 325 | 71.1 | 27.4 |
| 400 | 54.0 | 19.6 |

TABLE 3

Contaminants in Supernatant Liquid

| | Sample ID | |
|---|---|---|
| Mesh Fe | mg/L Cu | mg/L Fe |
| >230 | 2.20 | 19.500 |
| 230 | 0.20 | 20.900 |
| 325 | 1.04 | 15.900 |
| 400 | 1.10 | 16.100 |

Table 2 clearly shows that when iron is used as the reducing metal, a mesh size of about 325 is a preferred mesh size for increasing the amount of copper metal that is obtained in the dried cakes. Increasing the amount of copper in the dried cakes is important because such metal can then be reused. This does not mean that only metal powders having a mesh size of 325 are suitable for the present invention. Rather, the data presented in Table 2 illustrates that a range of metal particle sizes are suitable for practicing the invention, but that certain particle sizes are superior to others in terms of the amount of copper that can be recovered.

Table 3 illustrates the effects of particle size on the amount of copper ion remaining in solution following treatment with iron powders. This is an important consideration in view of the environmental regulations concerning the disposal of copper-ion containing effluents. Table 3 shows that an iron powder having a mesh size of about 230 reduced the amount of copper ions remaining in solution relative to iron powders having a larger mesh size (smaller particles). This is somewhat surprising as one might have predicted that smaller metal particles, having an increased surface area, would provide better results. However, the results of Table 3 also demonstrate that all mesh sizes of 230 or greater reduced the amount of copper ion remaining in solution to about 1 ppm or less. Therefore, all such metal powders could be used to practice the present invention, which provides a method for reducing the copper ions in solution to levels generally suitable for disposal in accordance with current environmental regulations.

Having illustrated and described the principles of the present invention in many preferred embodiments, it should be apparent to those skilled in the art that the invention can be modified in arrangement and detail without departing from such principles. I claim all modifications coming within the spirit and scope of the following claims.

I claim:

1. A method for recovering copper metal from an aqueous solution containing copper ions, comprising the steps:
   (a) adding to the solution a sufficient amount of an acid to obtain a solution pH of less than about 2.5;
   (b) adding substantially pure metallic iron particles to the solution in an amount sufficient to chemically reduce the copper ions in solution, the iron particles having a mesh size of about 230 or greater;
   (c) adjusting the pH of the solution to at least about 5 by adding to the solution sufficient amounts of magnesium hydroxide, or a compound which forms magnesium hydroxide in an aqueous system; and
   (d) recovering precipitated copper metal.

2. The method of claim 1 wherein said iron particles comprise iron powder that is at least about 70% pure.

3. The method of claim 1 wherein the predominant mesh size of said iron particles in step (b) is from about 230 to about 400.

4. The method of claim 3 wherein said predominant mesh size is about 325.

5. The method of claim 1 wherein the acid of step (a) is an inorganic acid.

6. The method of claim 5 wherein said inorganic acid is sulfuric acid.

7. The method of claim 1 wherein the solution pH in step (a) is adjusted to from about 1.0 to about 2.0.

8. The method of claim 1 wherein said aqueous solution containing copper ions is diluted with water prior to step (a).

9. The method of claim 8 wherein the degree of dilution is at least a two-fold volume dilution.

10. The method of claim 9 wherein said degree of dilution is from about a three-fold to about a six-fold volume dilution.

11. The method of claim 10 wherein said degree of dilution is about a five-fold volume dilution.

12. The method of claim 1, wherein the iron particles are added to the solution in a batch process.

13. The method of claim 1, wherein the iron particles are added to the solution continuously.

14. The method of claim 13 wherein the electrical potential of the solution is continuously monitored during step (b).

15. The method of claim 1 including the step of discharging the resulting solution, after step (d), into public waste waters.

16. A method for recovering copper metal from an ammoniacal circuit board etching solution, comprising the steps:
   (a) adding to the solution a sufficient amount of an acid to obtain a solution pH of less than about 2.5;
   (b) adding substantially pure metallic iron particles to the solution in an amount sufficient to chemically reduce the copper ions in solution, the iron particles having a mesh size of about 230 or greater;
   (c) adjusting the pH of the solution to at least about 5 by adding to the solution sufficient amounts of magnesium hydroxide, or a compound which forms magnesium hydroxide in an aqueous system; and
   (d) recovering precipitated copper metal.

17. The method of claim 16 wherein said iron particles comprise iron powder that is at least about 70% pure.

18. The method of claim 16, wherein the predominant mesh size of said iron particles in step (b) is from about 230 to about 400.

19. The method of claim 16 wherein said acid is sulfuric acid.

20. The method of claim 16 wherein said ammoniacal circuit board etching solution is diluted with water prior to step (a).

21. The method of claim 20 wherein said dilution is from about a three-fold to about a six-fold volume dilution.

22. The method of claim 1, wherein the iron particles are added to the solution continuously.

23. The method of claim 22 wherein the electrical potential of the solution is continuously monitored during step (b).

* * * * *

UNITED STATES PATENT AND TRADEMARK OFFICE
CERTIFICATE OF CORRECTION

PATENT NO. : 5,906,749
DATED : May 25, 1999
INVENTOR(S) : Bolser

It is certified that error appears in the above-identified patent and that said Letters Patent is hereby corrected as shown below:

Column 2,
Line 34, change "copper (0)" to read -- copper (0) --

Column 3,
Lines 55-6, change "iron (0) to read -- iron (0) -- and "copper (0) to read -- copper (0) --

Column 4,
Line 21, change "$^1/2O_2$" to read -- $\frac{1}{2}O_2$ --
Line 29, change "$^1/2O_2$" to read -- $\frac{1}{2}O_2$ --
Line 45, change "Fe (0)" to read -- Fe (0) --
Line 59, indent section heading:
    "B. Metal Powder"

Column 5,
Line 12, change "copper (0)" to read -- copper (0) --
Line 23, change "copper (0)" to read -- copper (0) --
Line 28, change "copper (0)" to read -- copper (0) --

Column 6,
Line 27, indent section heading:
    "A. Dilution"
Line 58, indent section heading:
    B. Acidification

UNITED STATES PATENT AND TRADEMARK OFFICE
CERTIFICATE OF CORRECTION

PATENT NO. : 5,906,749
DATED : May 25, 1999
INVENTOR(S) : Bolser

It is certified that error appears in the above-identified patent and that said Letters Patent is hereby corrected as shown below:

<u>Column 7,</u>
Line 7, indent section heading:
    "C. Addition of Finely-Divided Metal Powder"

<u>Column 8,</u>
Line 9, indent section heading:
    "D. Recovery Reducing Metals"

<u>Column 10,</u>
Line 16, change "ph" to read -- pH --

Signed and Sealed this

Eighth Day of January, 2002

Attest:

JAMES E. ROGAN
Attesting Officer    *Director of the United States Patent and Trademark Office*